US010522147B2

(12) United States Patent
Varner et al.

(10) Patent No.: US 10,522,147 B2
(45) Date of Patent: Dec. 31, 2019

(54) DEVICE AND METHOD FOR GENERATING TEXT REPRESENTATIVE OF LIP MOVEMENT

(71) Applicant: MOTOROLA SOLUTIONS, INC., Chicago, IL (US)

(72) Inventors: Stephen Varner, Xenia, OH (US); Wei Lin, Lake Zurich, IL (US); Randy L. Ekl, Downers Grove, IL (US); Daniel A. Law, Glencoe, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 88 days.

(21) Appl. No.: 15/850,814

(22) Filed: Dec. 21, 2017

(65) Prior Publication Data
US 2019/0198022 A1 Jun. 27, 2019

(51) Int. Cl.
| | | |
|---|---|---|
| *G10L 15/22* | (2006.01) | |
| *G06F 3/16* | (2006.01) | |
| *G10L 15/25* | (2013.01) | |
| *G06K 9/00* | (2006.01) | |
| *G10L 15/26* | (2006.01) | |
| *G10L 25/57* | (2013.01) | |
| *G10L 25/60* | (2013.01) | |

(52) U.S. Cl.
CPC .......... *G10L 15/25* (2013.01); *G06K 9/00335* (2013.01); *G06K 9/00711* (2013.01); *G10L 15/26* (2013.01); *G10L 25/57* (2013.01); *G10L 25/60* (2013.01)

(58) Field of Classification Search
CPC ......... G10L 15/24; G10L 15/20; G10L 15/00; G10L 17/00
See application file for complete search history.

(56) References Cited

U.S. PATENT DOCUMENTS

| | | | | |
|---|---|---|---|---|
| 7,587,318 | B2 * | 9/2009 | Seshadri | G10L 15/25 382/116 |
| 8,442,820 | B2 | 5/2013 | Kim et al. | |
| 8,700,392 | B1 * | 4/2014 | Hart | G10L 15/25 704/231 |
| 9,548,048 | B1 | 1/2017 | Solh et al. | |

(Continued)

OTHER PUBLICATIONS

Rothkrantz, Leon, "Lip-Reading by Surveillance Cameras", Smart Cities Symposium Prague 2017, pp. 1-6.

(Continued)

*Primary Examiner* — Shreyans A Patel
(74) *Attorney, Agent, or Firm* — Perry + Currier, Inc.

(57) ABSTRACT

A device and method for generating text representative of lip movement is provided. One or more portions of video data are determined that include: audio with an intelligibility rating below a threshold intelligibility rating; and lips of a human face. A lip-reading algorithm is applied to the one or more portions of the video data to determine text representative of detected lip movement in the one or more portions of the video data. The text representative of the detected lip movement is stored in a memory. A transcript that includes the text representative of the detected lip movement may be generated. Captioned video data may be generated from the video data and the text representative of detected lip movement.

16 Claims, 9 Drawing Sheets

(56) References Cited

U.S. PATENT DOCUMENTS

| | | | |
|---|---|---|---|
| 2009/0018831 A1* | 1/2009 | Morita | G10L 15/24 |
| | | | 704/246 |
| 2011/0164742 A1* | 7/2011 | Harma | H04M 1/6033 |
| | | | 379/219 |
| 2014/0010418 A1 | 1/2014 | Dey et al. | |
| 2014/0371599 A1* | 12/2014 | Wu | A61B 5/0077 |
| | | | 600/476 |
| 2015/0248898 A1 | 9/2015 | Loukina et al. | |
| 2016/0127641 A1* | 5/2016 | Gove | G06T 1/0007 |
| | | | 348/143 |

OTHER PUBLICATIONS

Chen, Tsuhan, "Audiovisual Speech Processing Lip Reading and Lip Synchronization", IEEE Signal Processing Magazine, Jan. 2001, pp. 9-21.

ISA/EP, International Search Report and Written Opinion, dated Mar. 13, 2019, re PCT International Patent Application No. PCT/US2018/064952.

* cited by examiner

DEVICE AND METHOD FOR GENERATING TEXT REPRESENTATIVE OF LIP MOVEMENT

BACKGROUND OF THE INVENTION

Thousands of hours of video are often stored in digital evidence management systems. Such video may be retrieved for use in investigations and court cases. Accessing audio content, and specifically speech, in such video may be important, but there are circumstances where such audio content may be indecipherable.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
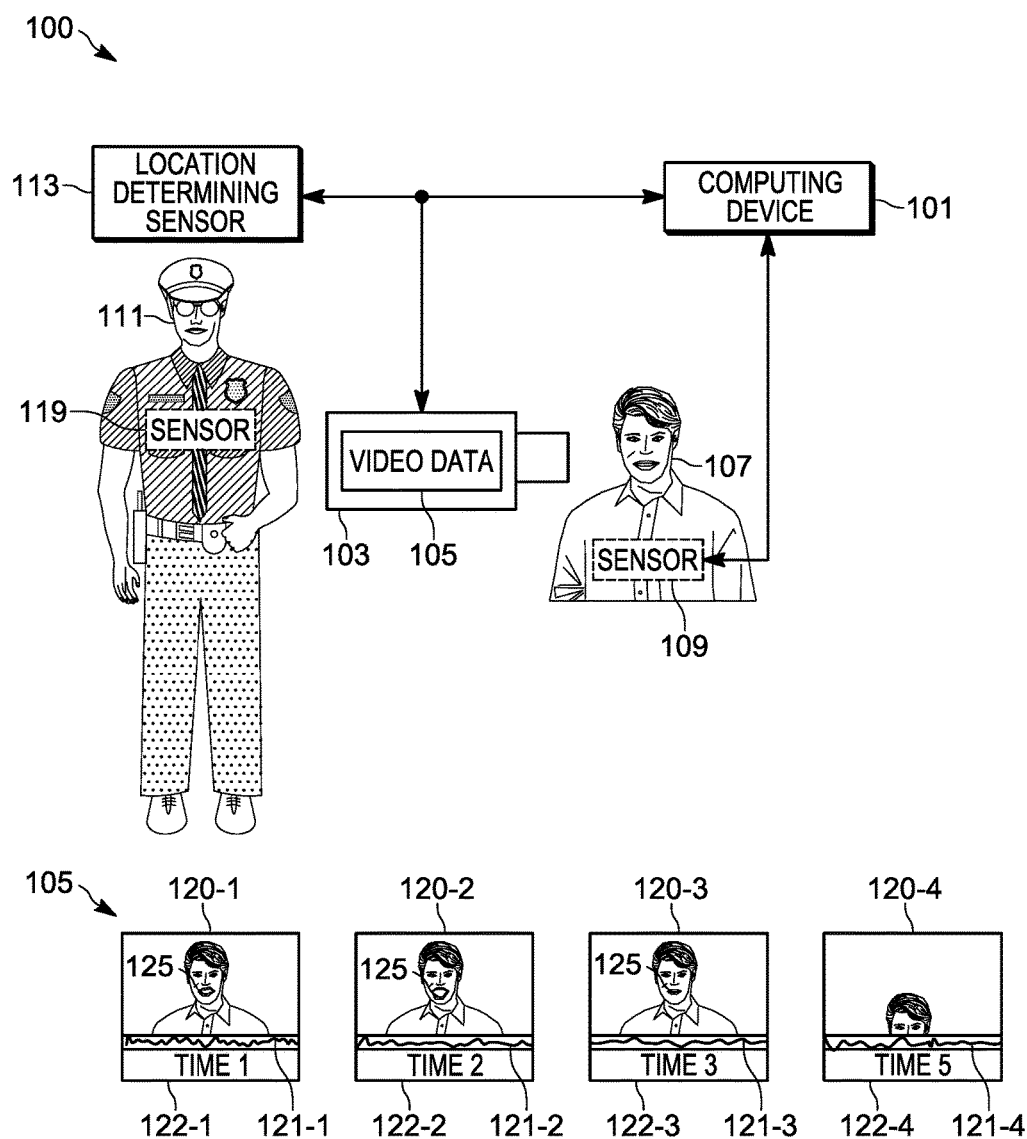
FIG. 1 is a system that includes a computing device for generating text representative of lip movement in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a controller and a memory, the controller configured to: determine one or more portions of video data that include: audio with an intelligibility rating below a threshold intelligibility rating; and lips of a human face; apply a lip-reading algorithm to the one or more portions of the video data to determine text representative of detected lip movement in the one or more portions of the video data; and store, in the memory, the text representative of the detected lip movement.

An aspect of the specification provides a method comprising: determining, at a computing device, one or more portions of video data that include: audio with an intelligibility rating below a threshold intelligibility rating; and lips of a human face; applying, at the computing device, a lip-reading algorithm to the one or more portions of the video data to determine text representative of detected lip movement in the one or more portions of the video data; and storing, in a memory, the text representative of the detected lip movement.

Attention is directed to FIG. 1, which depicts a schematic view of a system 100 that includes a computing device 101, a video camera 103 that acquires video data 105, for example of at least one person 107. As depicted, the person 107 is wearing an optional sensor 109, such as a heart rate monitor and the like. As depicted, the video camera 103 is being operated by a first responder 111 (interchangeably referred as the responder 111), such as a police officer and the like; indeed, the video camera 103 may comprise a body-worn video camera, and the person 107 may comprise a suspect and/or member of the public with whom the first responder 111 is interacting and/or interrogating. As depicted, the first responder 111 is associated with a location determining sensor 113, such as a global positioning system (GPS) device, a triangulation device, and the like; for example, the location determining sensor 113 may be a component of a communication device (not depicted) being operated by the first responder 111 and/or may be a component of the video camera 103. The system 100 may include any other types of sensors, and the like, that may generate context data associated with the video camera 103 acquiring the video data 105, including, but not limited to a clock device. As a further example, as depicted, the responder 111 is wearing a sensor 119 similar to the sensor 109. Furthermore, while example embodiments are described with respect to a responder 111 interacting with the person 107, the responder 111 may be any person interacting with the person 107 including, but not limited to, members of the public (e.g. assisting a public safety agency, and the like), private detectives, etc.

As depicted, the computing device 101 is configured to receive data from each of the video camera 103 (i.e. the video data 105), the sensors 109, 119, the location determining sensor 113, as well as any other sensors in the system 100 for generating context data. For example, as depicted, the computing device 101 is in communication with each of the video camera 103, the sensors 109, 119, the location determining sensor 113 via respective links; however, in other embodiments, the data from each of the video camera 103, the sensors 109, 119, the location determining sensor 113, and the like, may be collected from each of the video camera 103, the sensors 109, 119, the location determining sensor 113, and the like, for example by the responder 111, and uploaded to the computing device 101, for example in an incident report generated, for example, by the first responder 111, a dispatcher, and the like.

FIG. 1 further depicts an example of the video data 105, which comprises a plurality of portions 120-1, 120-2, 120-3, 120-4 that include video, as well as associated audio 121-1 121-2, 121-3, 121-4, each of the plurality of portions 120-1, 120-2, 120-3, 120-4 corresponding to respective time data 122-1, 122-2, 122-3, 122-4. The plurality of portions 120-1, 120-2, 120-3, 120-4 will be interchangeably referred to hereafter, collectively, as the portions 120 and, generically, as a portion 120; similarly, the audio 121-1, 121-2, 121-3, 121-4 will be interchangeably referred to hereafter, collectively and generically as the audio 121; and the respective time data 122-1, 122-2, 122-3, 122-4 will be interchangeably referred to hereafter, collectively the time data 122 and, generically, as time data 122.

While only four portions 120 are depicted, the number of portions 120 may depend on the length (i.e. number of hours, minutes and/or seconds) of the video data 105. Furthermore, the portions 120 may be of different lengths. Indeed, initially, the video data 105 is not partitioned into the portions 120, and is generally a continuous video, and/or a plurality of continuous videos, that includes the portions 120. As will be described below, the device 101 may partition the video data 105 into the portions 120 based on words in the audio 121.

In some embodiments, the portions 120 may be associated with an incident, such as an arrest of the person 107. Furthermore, the video data 105 may include other portions and/or sections which are not associated with the incident. In other words, the video data 105 may include further portions and/or sections before and after the depicted portions 120.

In the portions 120-1, 120-2 120-3 a face of the person 107 is visible, including lips 125 of the person 107, but in the portion 120-4, the lips 125 are not visible: for example, the person 107 and/or the video camera 103 may have moved relative to each other.

It is assumed herein that each of the associated audio 121 comprises an associated audio track that includes words being spoken by the person 107, the audio 121 being acquired by a microphone of the video camera 103 and the like. However, not all of the words in the associated audio 121 may be decipherable and/or intelligible due to muting, microphone problems, noise in the associated audio 121, or other issues, which can make transcribing the words challenging and/or difficult.

It is further assumed that the time data 122 comprise metadata in the video data 105 that include a time and/or a date of acquisition of the video data 105; for example, each set of the time data 122 may comprise a time of day that each frame, image etc. that each of the portions 120 were acquired. Such video metadata may also include a location, for example as determined by the location determining sensor 113, when the location determining sensor 113 is a component of the video camera 103.H Attention is next directed to FIG. 2 which depicts a block diagram of the computing device 101 (interchangeably referred to hereafter as the device 101) which includes: a controller 220, a memory 222 storing an application 223, and a communication interface 224 (interchangeably referred to hereafter as the interface 224). The depicted, the device 101 optionally comprises a display device 226 and at least one input device 228.

As depicted, the device 101 generally comprises one or more of a server, a digital evidence management system (DEMS) server and the like. In some embodiments, the device 101 is a component of a cloud-based computing environment and/or has been configured to offer a web-based and/or Internet-based service and/or application.

Figure 2:
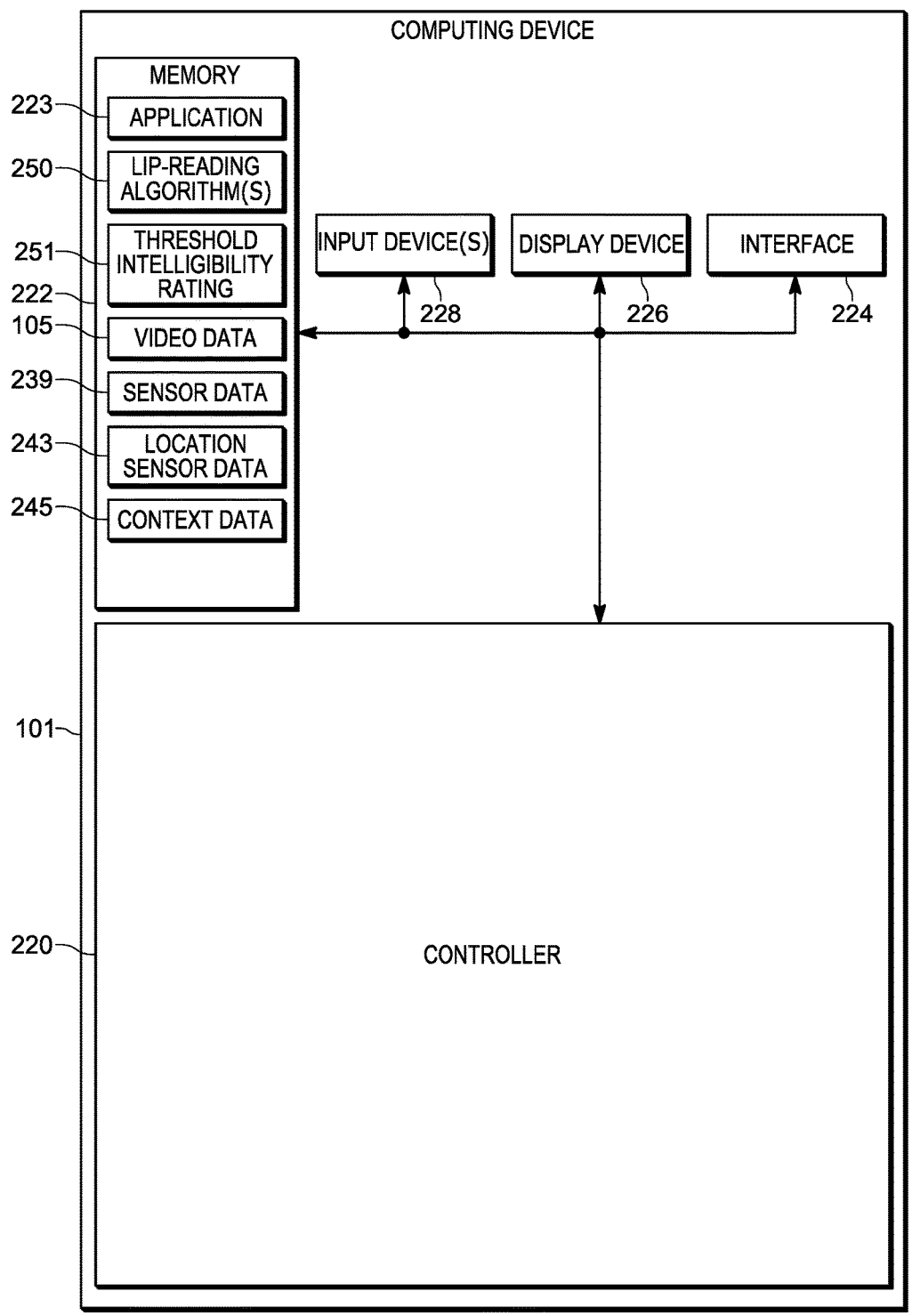
FIG. 2 is a schematic block diagram of a computing device for generating text representative of lip movement in accordance with some embodiments.

With reference to FIG. 2, the controller 220 includes one or more logic circuits configured to implement functionality for generating text representative of lip movement. Example logic circuits include one or more processors, one or more microprocessors, one or more ASIC (application-specific integrated circuits) and one or more FPGA (field-programmable gate arrays). In some embodiments, the controller 220 and/or the device 101 is not a generic controller and/or a generic computing device, but a computing device specifically configured to implement functionality for generating text representative of lip movement. For example, in some embodiments, the device 101 and/or the controller 220 specifically comprises a computer executable engine configured to implement specific functionality for generating text representative of lip movement.

The memory 222 of FIG. 2 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

As depicted, the memory 222 further stores the video data 105, sensor data 239 (for example generated by the sensors 109, 119), location sensor data 243 (for example generated by the location determining sensor 113), and context data 245. Each of the video data 105, the sensor data 239, the location sensor data 243, and the context data 245 may be received at the device 101 in an incident report, and the like, and are associated with the one or more portions 120 of the video data 105.

The context data 245 may include, but is not limited to, time(s), a date, a location and incident data (e.g. defining an incident, such as an arrest of the person 107) of an incident associated with the one or more portions 120 of the video data 105. For example, times and/or location in the context data 245 may corresponds to the one or more portions 120 of the video data 105.

In some embodiments, the context data 245 may be indicative of one or more of: a severity of an incident that corresponds to the one or more portions 120 of the video data 105; and a role of a person that captured the one or more portions 120 of the video data 105, such as the responder 111. For example, the severity of the incident may be defined by an incident type in the context data 245 (e.g. as received in the incident report), such as "Homicide", "Robbery", and the like. The role of a person that captured the video data 105 may be defined by a title of the person such as "Officer", "Captain", "Detective", and the like.

The sensor data 239 may be indicative of the incident that corresponds to the one or more portions 120 of the video data 105; for example, the sensor data 239, as generated by the sensors 109, 119 (e.g. received in an incident report), may be associated with the incident, and further indicative of one or more of: a level of excitement of the person 107 with whom the lips 125 in the one or more portions 120 of the video data 105 are associated, and/or a level of excitement of the responder 111; and a heart rate of the person 107 and/or a heart rate of the responder 111. For example, the higher the heart rate, the higher the level of excitement. Furthermore, the heart rate of the person 107 and/or the responder 111 may be stored as a function of time in the sensor data 239.

Furthermore, the sensor data 239 may be acquired when the person 107 is interrogated and the sensor 109 is placed on the person 107, for example by the responder 111, and/or the responder 111 puts on the sensor 119; alternatively, the person 107 may be wearing the sensor 109, and/or the responder 111 may be wearing the sensor 119, when the responder 111 interacts with the person 107 during an incident, the sensor data 239 acquired from the sensors 109, 119 either during the incident, or afterwards (e.g. in response to a subpoena, and the like).

The location sensor data 243, as generated by the location determining sensor 113 (e.g. received in an incident report) may also be indicative of the incident that corresponds to the one or more portions 120 of the video data 105. For example, the location sensor data 243 may comprise GPS coordinates, a street address, and the like of the location of where the video data 105 was acquired.

While the sensor data 239, the location sensor data 243, and the context data 245 are depicted as being separate from each other, the sensor data 239, and the location sensor data 243 may be stored at the context data 245.

While the video data 105, the sensor data 239, the location sensor data 243, and the context data 245, are depicted as being initially stored at the memory 222, alternatively, at least the video data 105 may be streamed from the video camera 103 to the device 101, rather than being initially stored at the memory 222. Such streaming embodiments assume that the video camera 103 is configured for such streaming and/or network communication. In these embodiments, one or more of the sensor data 239, the location sensor data 243, and the context data 245 may not be available; however, one or more of the sensor data 239, the location sensor data 243, and the context data 245 also be streamed to the device 101. However, in all embodiments, one or more of the sensor data 239, the location sensor data 243, and the context data 245 may be optional. In other embodiments, the video data 105, and (and optionally the sensor data 239, the location sensor data 243, and the context data 245) may be uploaded from a user device to the device 101, for example in a pay-as-you-go and/or pay-for-service scenario, for example when the device 101 is offering a web-based and/or Internet-based service and/or application. Alternatively, the device 101 may be accessed as part of a web-based and/or Internet-based service and/or application, for example by an officer of the court wishing to have analysis performed on the video data 105 as collected by the responder 111.

As depicted, the memory 222 further stores one or more lip-reading algorithms 250, which may be a component of the application 223 and/or stored separately from the application 223. Such lip-reading algorithms 250 may include, but are not limited to, machine learning algorithms, neural network algorithms and/or any algorithm used to convert lip movement in video to text.

Similarly, as depicted, the memory 222 further stores a threshold intelligibility rating 251, which may be a component of the application 223 and/or stored separately from the application 223. Furthermore, the threshold intelligibility rating 251 may be adjustable and/or dynamic.

In particular, the memory 222 of FIG. 2 stores instructions corresponding to the application 223 that, when executed by the controller 220, enables the controller 220 to: determine one or more portions 120 of the video data 105 that include: audio 121 with an intelligibility rating below the threshold intelligibility rating 251; and lips of a human face; apply the lip-reading algorithm 250 to the one or more portions 120 of the video data 105 to determine text representative of detected lip movement in the one or more portions of the video data 105; and store, in a memory (e.g. the memory 222 and/or another memory), the text representative of the detected lip movement.

The display device 226, when present, comprises any suitable one of, or combination of, flat panel displays (e.g. LCD (liquid crystal display), plasma displays, OLED (organic light emitting diode) displays) and the like. The input device 228, when present, may include, but is not limited to, at least one pointing device, at least one touchpad, at least one joystick, at least one keyboard, at least one button, at least one knob, at least one wheel, combinations thereof, and the like.

The interface 224 is generally configured to communicate other devices using wired and/or wireless communication links, as desired, including, but not limited to, cables, WiFi links and the like.

The interface 224 is generally configured to communicate with one or more devices from which the video data 105 is received (and, when present, one or more of the sensor data 239, the location sensor data 243, and the context data 245, and the like), for example the video camera 103. The interface 224 may implemented by, for example, one or more radios and/or connectors and/or network adaptors, configured to communicate wirelessly, with network architecture that is used to implement one or more communication links and/or communication channels between the device 101 and the one or more devices from which the video data 105, etc., is received. Indeed, the device 101 and the interface 224 may generally facilitate communication with such devices using communication channels. In these embodiments, the interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interface 224 may include one or more local area network or personal area network transceivers operating in accordance with an IEEE 802.11 standard (e.g., 802.11a, 802.11b, 802.11g), or a Bluetooth transceiver which may be used to communicate with other devices. In some embodiments, the interface 224 is further configured to communicate "radio-to-radio" on some communication channels (e.g. in embodiments where the interface 224 includes a radio), while other communication channels are configured to use wireless network infrastructure.

Example communication channels over which the interface 224 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 224 communicates with the one or more devices from which the video data 105, etc., is received using other servers and/or communication devices, for example by communicating with the other servers and/or communication devices using, for example, packet-based and/or internet protocol communications, and the like, and the other servers and/or communication devices use radio communications to wirelessly communicate with the one or more devices from which the video data 105, etc., is received.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like. Indeed, groups of channels may be logically organized into talkgroups, though channels in a talkgroup may be dynamic as the traffic (e.g. communications) in a talkgroup may increase or decrease, and channels assigned to the talkgroup may be adjusted accordingly.

For example, when the video camera 103 comprises a body-worn camera, the video camera 103 may be configured to stream the video data 105 to the device 101 using such channels and/or talkgroups using a respective communication interface configured for such communications.

In any event, it should be understood that a wide variety of configurations for the device 101 are within the scope of present embodiments.

Figure 3:
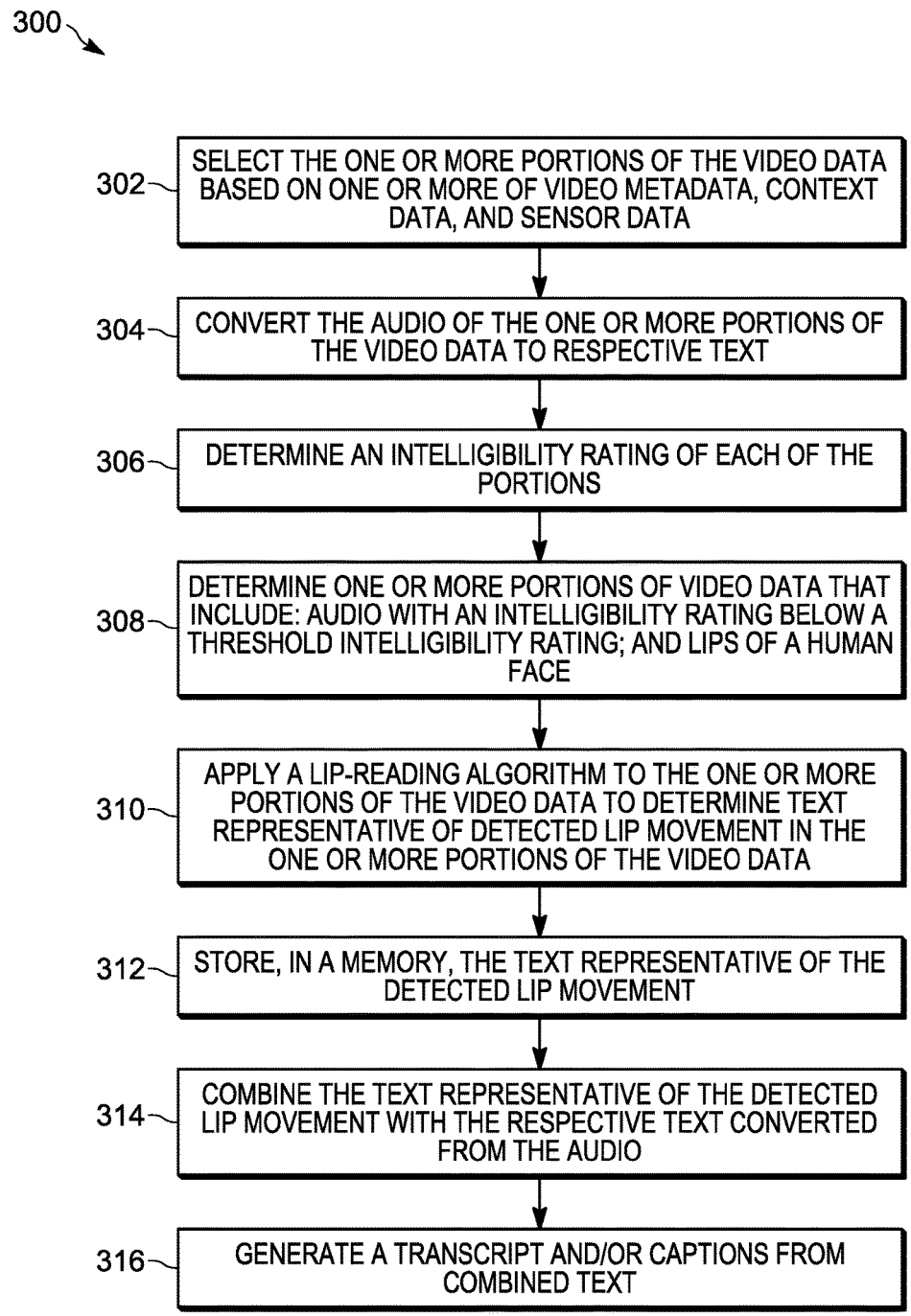
FIG. 3 is a flowchart of a method for generating text representative of lip movement in accordance with some embodiments.

Attention is now directed to FIG. 3 which depicts a flowchart representative of a method 300 for generating text representative of lip movement. The operations of the method 300 of FIG. 3 correspond to machine readable instructions that are executed by, for example, the device 101, and specifically by the controller 220 of the device 101. In the illustrated example, the instructions represented by the blocks of FIG. 3 are stored at the memory 222, for example, as the application 223. The method 300 of FIG. 3 is one way in which the controller 220 and/or the device 101 is configured. Furthermore, the following discussion of the method 300 of FIG. 3 will lead to a further understanding of the device 101, and its various components. However, it is to be understood that the device 101 and/or the method 300 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the device 101 of FIG. 1, as well. For example, while present embodiments are described with respect to the video data 105 being stored at the memory 222, in other embodiments, the method 300 may be implemented as the video data 105 is received at the device 101, for example, when the video data 105 is streamed to the device 101.

At a block 302, the controller 220 selects the portions 120 of the video data 105 based on one or more of video metadata (e.g. the time data 122), the context data 245, and the sensor data 239.

At a block 304, the controller 220 converts the audio 121 of the one or more portions 120 of the video data 105 to respective text. Such a conversion can include partitioning the video data 105 into the portions 120, with one word in the audio 121 corresponding to a respective portion 120.

At a block 306, the controller 220 determines an intelligibility rating for each of the portions 120, for example an intelligibility rating for each word in each respective portion 120.

At a block 308, the controller 220 determines one or more portions 120 of the video data 105 that include audio 121 with an intelligibility rating below the threshold intelligibility rating 251 and lips of a human face.

At a block 310, the controller 220 applies the lip-reading algorithm(s) 250 to the one or more portions 120 of the video data 105 to determine text representative of detected lip movement in the one or more portions of the video data 105.

At a block 312, the controller 220 stores, in a memory (e.g. the memory 222 and/or another memory), the text representative of the detected lip movement.

At a block 314, the controller 220 combines the text representative of the detected lip movement with the respective text converted from the audio 121.

At a block 316, the controller 220 generates a transcript and/or captions for the video data 105 from the combined text.

The method 300 will now be described with respect to FIG. 4 to FIG. 8, each of which are similar to FIG. 2, with like elements having like numbers. In each of FIG. 4 to FIG. 8, the controller 220 is executing the application 223.

Figure 4:
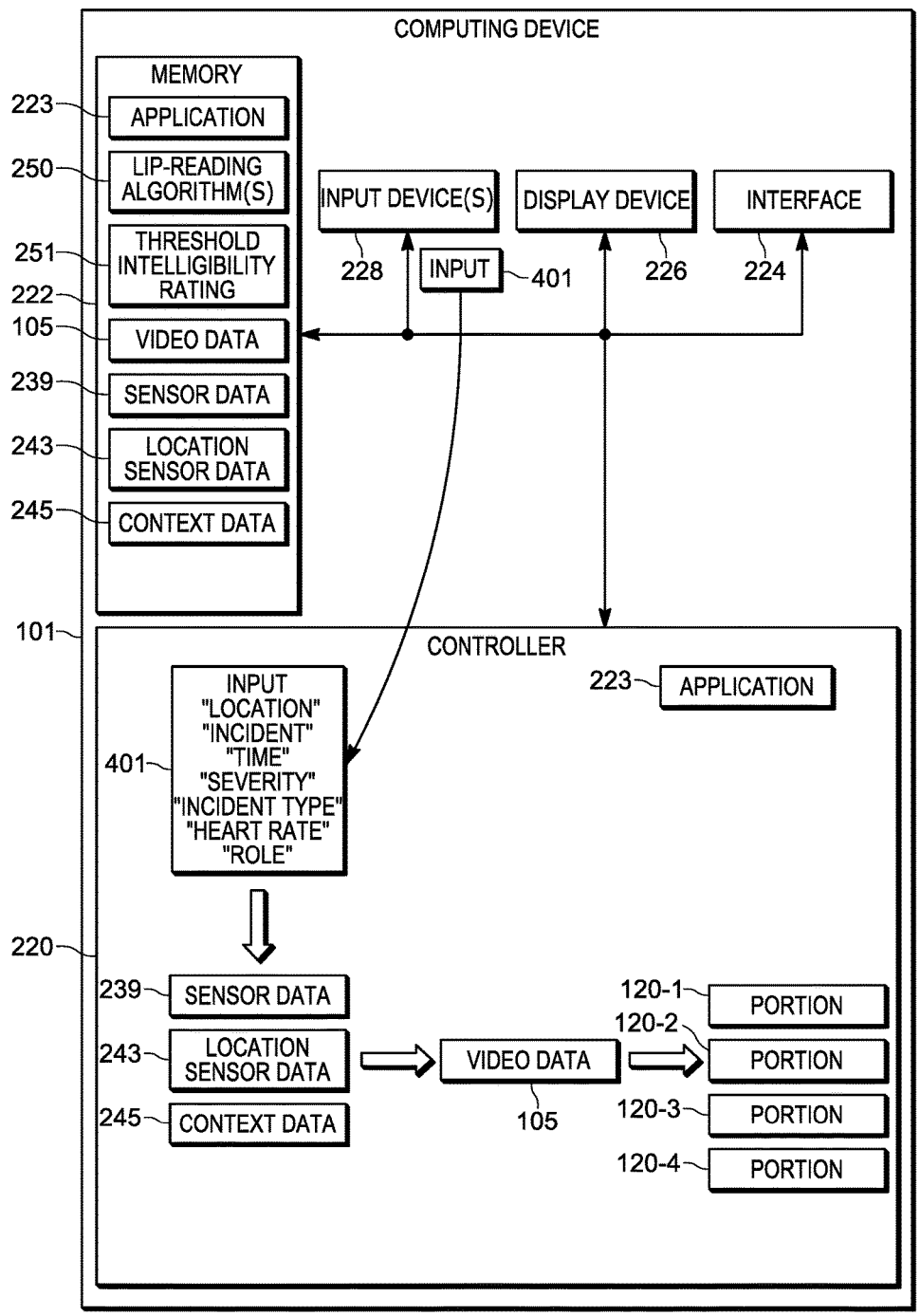
FIG. 4 depicts the computing device selecting portions of video data for generating text representative of lip movement based on context data in accordance with some embodiments.

Attention is next directed to FIG. 4, which depicts an example embodiment of the block 302 of the method 300. In particular, controller 220 is receiving input data, 401, for example via the input device 228, indicative of one or more of a location, an incident, a time (including, but not limited to a time period, a date, and the like), a severity of an incident, a heart rate of a person involved in the incident, a role of a person associated with incident and the like. The controller 220 compares the input data 401 with one or more of the sensor data 239, the location sensor data 243 and the context data 245 (each of which are associated with the portions 120 of the video data 105), to select (e.g. at the block 302 of the method 300) the one or more portions of the video data 105.

For example, the video data 105 may include sections other than the portions 120 and the input data 401 may be compared to one or more of the sensor data 239, the location sensor data 243 and the context data 245 to select the portions 120 from the video data 105.

Hence, the portions 120 of the video data 105 that correspond to a particular time, location, incident, etc., may be selected at the block 302, for example based on sensor data (e.g. the location sensor data 243 and/or the sensor data 239) and/or the context data 245 indicative of an incident that corresponds to the one or more portions 120 of the video data 105, while the other sections of the video data 105 are not selected. In such a selection of the portions 120, the video data 105 may not be partitioned into the portions 120; rather such a selection of the portions 120 comprises selecting the section(s) of the video data 105 that correspond to the portions 120 (e.g. all the portions 120), rather than an individual selection of each of the portions 120-1, 120-2, 120-3, 120-4.

Furthermore, while the input data 401 is depicted as being received from the input device 228, the input data 401 may be received via the interface 224, for example, as a message, a request, and the like from a remote device, and the like. For example, when the computing device 101 comprises a DEMS server, the input data 401 may be received in a request for the portions 120 of the video data 105 that correspond to a particular incident to be entered as evidence in a court proceeding, and the like.

Figure 5:
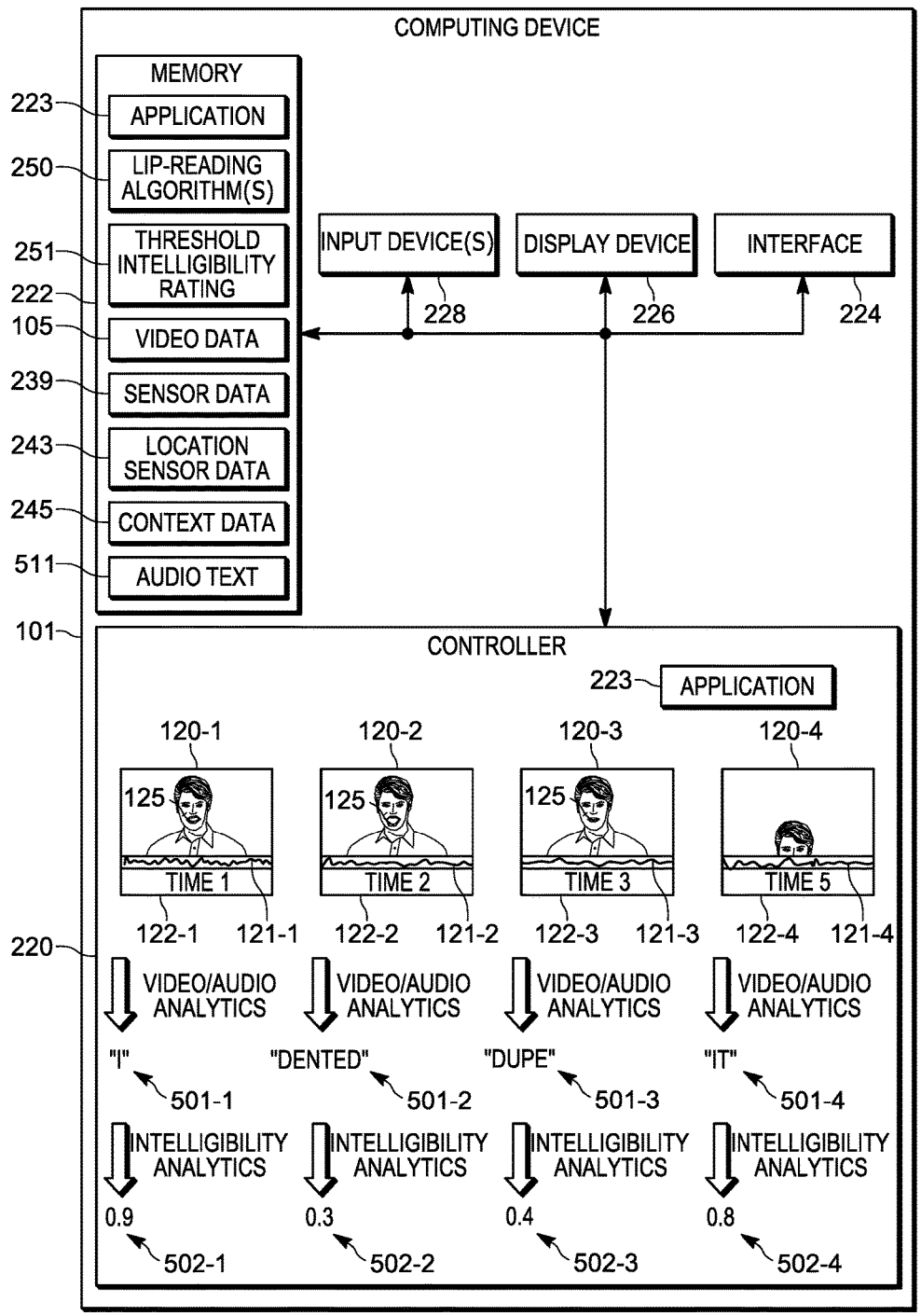
FIG. 5 depicts the computing device extracting words from audio of the video data and determining an intelligibility rating for each in accordance with some embodiments.

Attention is next directed to FIG. 5 which depicts an example embodiment of the block 304 of the method 300. In particular, the controller 220 has received the video data 105 and is partitioning the video data 105 into the portions 120.

As depicted, the partitioning of the video data 105 is performed using any suitable combination of video analytics algorithms and audio analytics algorithms to partition the video data 105 into the portions 120 where each portion 120 corresponds to one word spoken by the person 107 in the video data 105. For example, as depicted, the controller 220 has applied at least one video analytic algorithm and/or at least one audio analytic algorithm (which may be provided in the application 223) to partition the video data 105 into the portions 120, each of which correspond to words being spoken by the person 107 in the video data 105.

Furthermore, the at least one audio analytics algorithm may be used to convert the audio 121 of the portions 120 to respective text and, in particular, as depicted, respective words.

For example, as depicted, the controller 220 has converted the audio 121-1 of the portion 120-1 to a word 501-1, and in particular "I". Similarly, the controller 220 has converted the audio 121-2 of the portion 120-2 to a word 501-2, and in particular "Dented". Similarly, the controller 220 has converted the audio 121-3 of the portion 120-3 to a word 501-3, and in particular "Dupe". Similarly, the controller 220 has converted the audio 121-4 of the portion 120-4 to a word 501-4, and in particular "It". The words 501-1, 501-2, 501-3, 501-4 will be interchangeably referred to hereafter, collectively, as the words 501 and, generically, as a word 501.

For example, the audio 121 may be processed using a "speech-to-text" audio analytics algorithm and/or engine to determine which portions 120 of the video data 105 correspond to particular words 501 and/or to extract the words 501. Video analytics algorithms may be used to determine portions 120 of the video data 105 correspond to different words 501, for example by analyzing lip movement of the lips 125 (e.g. in portions 120 of the video data 105 where the lips 125 are visible) to determine where words 501 begin and/or end; such video analytics may be particularly useful when the audio 121 is unclear and/or there is noise in the audio 121.

As depicted, the controller 220 further stores the words 501 in the memory 222 as audio text 511. For example, the audio text 511 may comprise the words 501 in a same order as the words 501 occur in the video data 105. In the example of FIG. 5, the audio text 511 may hence comprise "I", "DENTED", "DUPE", "IT", for example, stored in association with identifiers of the respective portions 120-1, 120-2, 120-3 from which they were extracted and/or in association with respective start times, and the like, in the video data 105 from which the words 501-1, 501-2, 501-3 were extracted (e.g. the time data 122-1, 122-2, 122-3).

However, while as depicted, each of the words 501 have been extracted from the audio 121, in other embodiments, speech by the person 107 in some of the portions 120 may not be convertible to words; in other words, there may be so much noise, and the like, in given portions 120 that the controller 220 may determine that the person 107 is speaking a word, but the word, and/or an estimate thereof, may not be determinable. In such situations, a word 501 may be stored as a null set and/or as a placeholder data in the audio text 511 (e.g. to indicate a presence of an undeterminable word)

Also depicted in FIG. 5 is an example embodiment of the block 306 of the method 300. In particular, the controller 220 is applying intelligibility analytics to each of the portions 120 to determine a respective intelligibility rating of each of the words 501 in the portions 120.

For example, the intelligibility rating may be a number between 0 and 1. Furthermore, the controller 220 may determine the intelligibility rating by: binning frequencies in the audio 121 for each word 501; and determining respective intelligibility ratings for a plurality of bins. In other words, speech in specific frequency ranges may contribute more to intelligibility than in other frequency ranges; for example, a frequency region of interest for speech communication systems can be in a range from about 50 Hz to about 7000 Hz and in particular from about 300 Hz to about 3400 Hz. Indeed, a mid-frequency range from about 750 Hz to about 2381 Hz has been determined to be particularly important in determining speech intelligibility. Hence, a respective intelligibility rating may be determined for different frequencies and/or different frequency ranges, and a weighted average of such respective intelligibility rating may be used to determine the intelligibility rating at the block 306 with, for example, respective intelligibility ratings in a range of about 750 Hz to about 2381 Hz being given a higher weight than other frequency ranges.

Furthermore, there are various computational techniques available for determining intelligibility including, but not limited to, determining one or more of: amplitude modulation at different frequencies; speech presence or speech absence at different frequencies; respective noise levels at the different frequencies; respective reverberation at the different frequencies; respective signal-to-noise ratio at the different frequencies; speech coherence at the different frequencies; and speech distortion at the different frequencies.

Indeed, there are various analytical techniques available for quantifying speech intelligibility. For example, such analytical techniques may be used to quantify: speech presence/absence (e.g. whether or not frequency patterns present in the audio 121); reverberation (e.g. time between repeated frequency patterns in the audio 121); speech coherence (e.g. Latent Semantic Analysis); speech distortion (e.g. changes in frequency patterns of the audio 121), and the like. Indeed, any technique for quantifying speech intelligibility is within the scope of present embodiments.

For example, speech presence/absence of the audio 121 may be determined in range of about 750 Hz to about 2381 Hz, and a respective intelligibility rating may be determined for this range as well as above and below this range, with a highest weighting placed on the range of about 750 Hz to about 2381 Hz, and a lower weighting placed on the ranges above and below this range. A respective intelligibility rating may be determined for the frequency ranges using other analytical techniques available for quantifying speech intelligibility, with a higher weighting being placed on speech/presence absence and/or speech coherence than, for example, reverberation. Furthermore, such intelligibility analytics may be used to partition the video data 105 into the portion 120, as such intelligibility analytics may be used to determine portions 120 of the video data 105 that include particular words. Hence, the blocks 304, 306 may be combined and/or performed concurrently.

As depicted in FIG. 5, an intelligibility rating is generated at the block 306 for each of the words 501 between, for example 0 and 1. In particular, an intelligibility rating 502-1 of "0.9" has been generated for the word 501-1, an intelligibility rating 502-2 of "0.3" has been generated for the word 501-2, an intelligibility rating 502-3 of "0.4" has been generated for the word 501-3, and an intelligibility rating 502-4 of "0.9" has been generated for the word 501-4. The intelligibility ratings 502-1, 502-2, 502-3, 502-4 will be interchangeably referred to hereafter, collectively, as the intelligibility ratings 502 and, generically, as an intelligibility rating 502.

Furthermore, when a word 501 is not extractible and/or not determinable from the audio 121, the respective intelligibility rating 502 may be "0", indicating that a word 501 in a given portion 120 is not intelligible.

Figure 6:
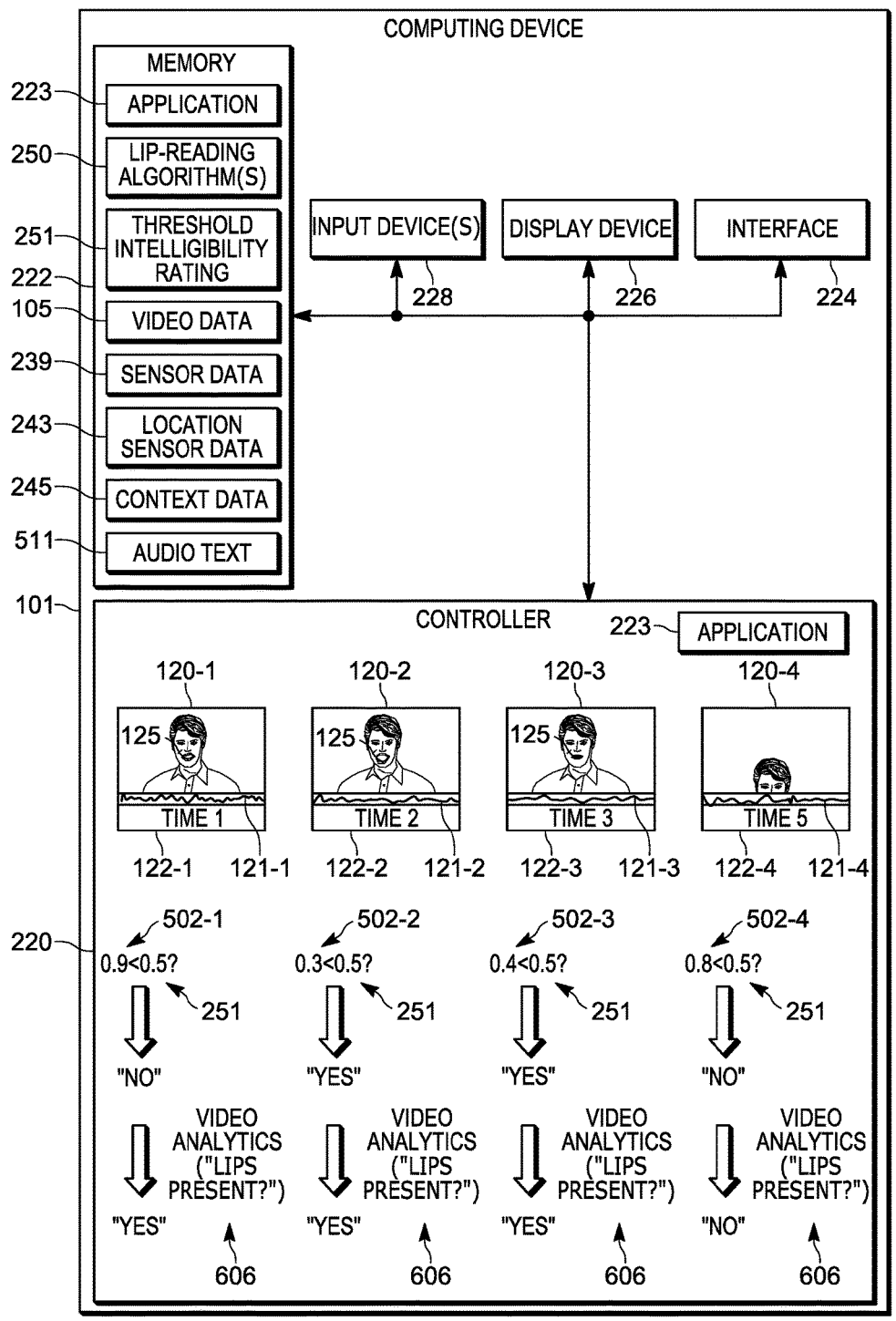
FIG. 6 depicts the computing device comparing the intelligibility ratings with a threshold intelligibility rating, and further determining portions of the video data that include lips in accordance with some embodiments.

Attention is next directed to FIG. 6 which depicts an example embodiment of the block 308 of the method 300 in which the intelligibility ratings 502 are compared to the threshold intelligibility rating 251. For example, each of the intelligibility ratings 251 may be a number between 0 and 1, and the threshold intelligibility rating 251 may be about 0.5 and/or midway between a lowest possible intelligibility rating ("0") and a highest possible intelligibility rating ("1").

Words 501 with an intelligibility rating 502 greater than, or equal to, the threshold intelligibility rating 251 may be determined to be intelligible, while words 501 with an intelligibility rating 502 below the threshold intelligibility rating 251 may be determined to be not intelligible.

Furthermore, the threshold intelligibility rating 251 may be dynamic; for example, the threshold intelligibility rating 251 may be raised or lowered based on heuristic feedback and/or feedback from the input device 228 and the like, which indicates whether the words 501 above or below a current threshold intelligibility rating are intelligible to a human being, or not. When words 501 above a current threshold intelligibility rating are not intelligible, the threshold intelligibility rating 251 may be raised; furthermore, the threshold intelligibility rating 251 may be lowered until words 501 above a lowered threshold intelligibility rating begin to become unintelligible.

As depicted, however, it is assumed that the threshold intelligibility rating 251 is 0.5, and hence, the intelligibility ratings 502-1, 502-4 of, respectively, 0.9 and 0.8 are above the threshold intelligibility rating 251, and hence the corresponding words 501-1, 501-4 (e.g. "I" and "It") are determined to be intelligible. In contrast, the intelligibility ratings 502-2, 502-3 of, respectively, 0.3 and 0.4 are below the threshold intelligibility rating 251, and hence the corresponding words 501-2, 501-3 (e.g. "Dented" and "Dupe") are determined to be unintelligible.

Also depicted in FIG. 6, the controller 220, for example, applies video analytics 606 to determine whether there are "Lips Present" in each of the portions 120. The video analytics 606 used to determine whether there are lips present may be the same or different video analytics used to partition the video data 105 into the portions 120. Such video analytics 606 may include, but are not limited to, comparing each of the portions 120 to object data, and the like, which defines a shape of lips of a human face; and hence such video analytics 606 may include, but is not limited to, object data analysis and the like. Furthermore, it is assumed herein that the video analytics 606 are a component of the application 223, however the video analytics may be provided as a separate engine and/or module at the device 101.

As depicted, the video analytics 606 have been used to determine that the portions 120-1, 120-2, 120-3 include the lips 125 (e.g. "YES"), while the portion 120-4 does not include the lips 125 (e.g. "NO").

It is further appreciated that in some embodiments, the controller 220 does not apply the video analytics 606 to portions 120 of the video data 105 with an intelligibility rating 502 above the threshold intelligibility rating 251; and/or the controller 220 does not determine an intelligibility rating 502 for the portions 120 of the video data 105 that do not include the lips 125 (e.g. as determined using the video analytics 606). In other words, the processes of application of the video analytics 606 and the determination of the intelligibility rating 502 may occur in any order and be used as a filter to determine whether to perform the other process.

Figure 7:
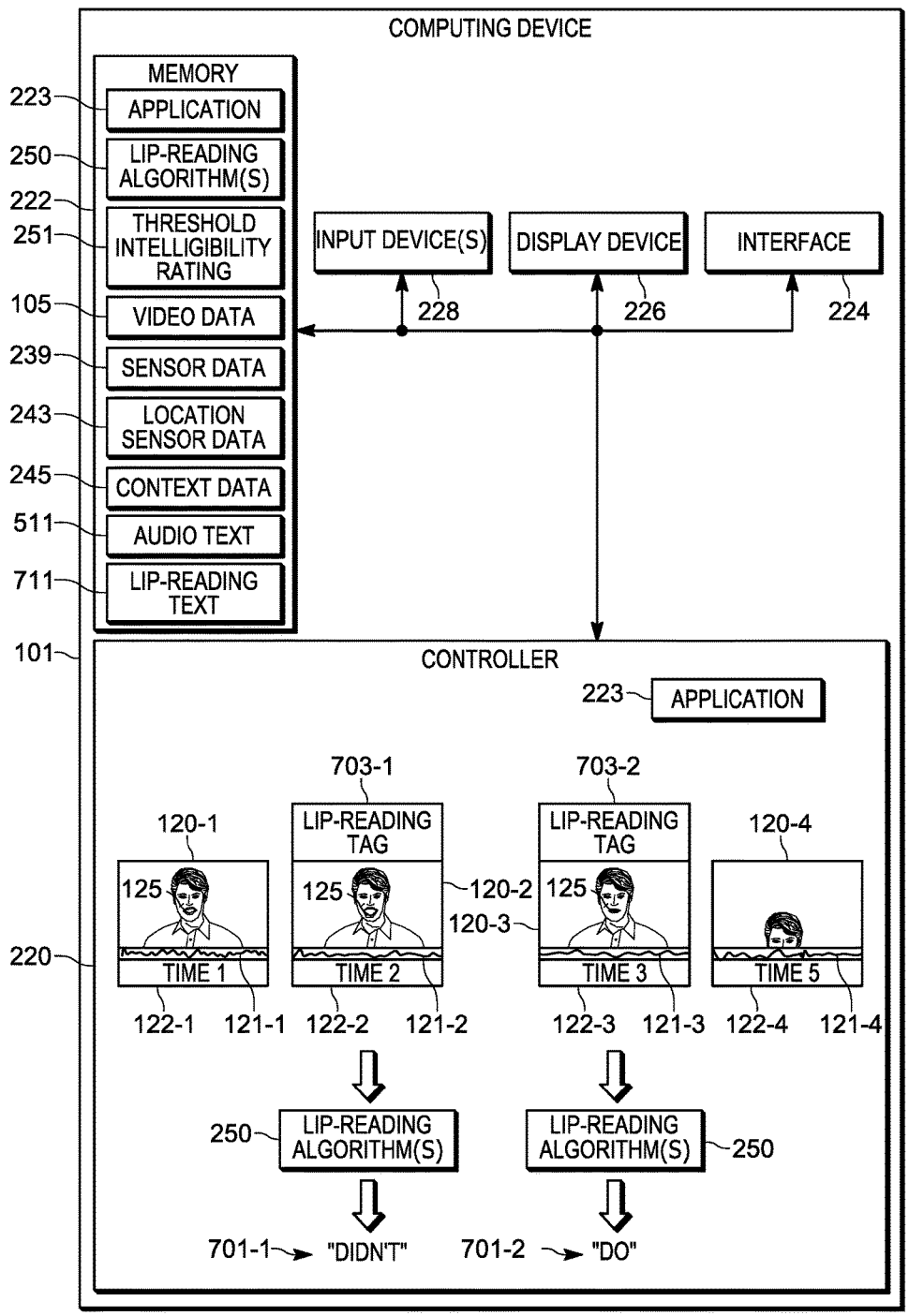
FIG. 7 depicts the computing device applying a lip-reading algorithm to portions of the video data where the intelligibility ratings are below the threshold intelligibility rating, and that include lips in accordance with some embodiments.

Attention is next directed to FIG. 7 which depicts an example embodiment of the block 310 of the method 300. In particular, the controller 220 is applying one or more of the lip-reading algorithms 250 to the portions 120-2, 120-3 where both the respective intelligibility rating 502 is below the threshold intelligibility rating 251, and where the lips 125 are present.

In particular, as depicted, the lip-reading algorithm 250 has been used to determine that the detected lip movement in the portion 120-2 corresponds to a word 701-1 of "Didn't", as compared to the word 501-2 of "Dented" extracted from the audio 121-2 having a relatively low intelligibility rating 502-2; furthermore, the lip-reading algorithm 250 has been used to determine that the detected lip movement in the portion 120-3 corresponds to a word 701-2 of "Do", as compared to the word 501-3 of "Dupe" extracted from the audio 121-3 having a relatively low intelligibility rating 502-3. The words 701-1, 701-2 will be interchangeably referred to hereafter, collectively, as the words 701 and, generically, as a word 701.

In some embodiments, the lip-reading algorithm 250 may be selected using the sensor data 239 to determine whether the person 107 was excited, or not, when the portions 120-2, 120-3 were acquired; for example, as the heart rate in the sensor data 239 may be stored as a function of time, a heart rate of the person 107 at the time data 122-2, 122-3 of the portions 120-2, 120-3 may be used to determine whether the person 107 was excited, or not, as a level of excitement of a person (e.g. as indicated by their heart rate) can change how a person's lips move when speaking; for example, an excited and/or shouting person may move their lips differently from a calm and/or speaking and/or whispering person. Some lip-reading algorithms 250 may be better than other lip-reading algorithms 250 at converting lip movement to text when a person is excited.

Furthermore, more than one lip-reading algorithm 250 may be applied to the portions 120-2, 120-3 as "ensemble" lip-reading algorithms. Use of more than one lip-reading algorithm 250 may lead to better accuracy when converting lip movement to text.

Also depicted in FIG. 7 is an alternative embodiment in which the controller 220 tags the portions 120-2, 120-3 that include the lips 125 and have an intelligibility rating below the threshold intelligibility rating 251 with metadata 703-1, 703-2, for example a metadata tag, and the like, which indicate that lip reading is to be automatically attempted on the portions 120-2, 120-3. Alternatively, a device of a user associated with the video data 105 may be notified of the suitability of the portions 120-2, 120-3 for lip reading that include the metadata 703-1, 703-2. For example, such a user may have caused a device to upload the video data 105 to the device 101 for analysis, for example in web-based log-in that includes registration of an email address, and the like.

Alternatively, the user, such as an officer of the court, may wish to initiate analysis on the video data 105 as collected by the responder 111, and the like, and may use a device to initiate such analysis, for example via a web-based log-in Indeed, in some embodiments, the portions 120-2, 120-3 are tagged with the metadata 703-1, 703-2 by the controller 220 at the block 308 of the method 300, and the controller 220 transmits a notification of the portions 120-2, 120-3 being tagged to a registered email address and/or stores the video data 105 with the portions 120-2, 120-3 tagged with the metadata 703-1, 703-2. Either way, the controller 120 may wait for input from the device of the user (and/or another device, for example via a web-based log-in) before proceeding with execution of the block 310 of the method 300 to apply the lip-reading algorithm 250. Alternatively, all portions 120s that include the lips 125 may be tagged with metadata similar to the metadata 703-1, 703-2, though such metadata may further depend on the intelligibility rating such that a user may decide to which portions 120 the lip-reading algorithm 250 is to be applied, for example in pay-as-you-go and/or pay-for-service scenario.

Furthermore, while current embodiments are described with respect to applying the lip-reading algorithm 250 to only those portions 120 where both the respective intelligibility rating 502 is below the threshold intelligibility rating 251, and where the lips 125 are present, in other embodiments, the lip-reading algorithm 250 may be applied to all of the portions 120 where the lips 125 are present, for example to confirm words 501 in the audio text 511. In addition, when the words 501 are already known within a confidence level defined by an intelligibility rating 502 being above the threshold intelligibility rating 251, applying the lip-reading algorithm 250 to those portions 120 to extract text may be used as feedback to improve the application of the lip-reading algorithm 250 to the portions where the intelligibility rating 502 is below the threshold intelligibility rating 251 (e.g. as may occur in machine learning based algorithms and/or neural network based algorithms). For example, words 701 extracted from portions 120 of the video data 105 using the lip-reading algorithm 250 may be compared with corresponding words 501 where the intelligibility rating 502 is relatively high to adjust the lip-reading algorithm 250 for accuracy.

In addition, in some embodiments, the lip-reading algorithm 250 is applied automatically when the controller 220 determines, at the block 308 that one or more portions 120 of the video data include both: audio 121 with an intelligibility rating 502 below the threshold intelligibility rating 251; and the lips 125 of a human face. However, in other embodiments, the controller 220 may provide, for example at the display device 226 an indication of the portions 120 where the lip-reading algorithm 250 may be used to enhance the words of the audio 121; a user may use the input device 228 to indicate whether the method 300 is to proceed, or not.

Alternatively, the device 101 may communicate with, for example, a remote device, from which the input data 401 was received, to provide an indication of the portions 120 where the lip-reading algorithm 250 may be used to enhance the words of the audio 121. The indication may be provided at a respective display device, and a user at the remote device (and the like) may use a respective input device to indicate whether the method 300 is to proceed, or not. The remote device may transmit the decision (e.g. as data in a message, and the like) to the device 101 via the interface 224; the device 101 may proceed with the method 300, or not, based on the received data.

Also depicted in FIG. 7 is an example embodiment of the block 312 of the method 300 as the controller 220 has stored, at the memory 222, lip-reading text 711 representative of the detected lip movement. For example, the text 711 comprises the words 701-1, 701-2 "Didn't" and "Do" in association with identifiers of the respective portions 120-2, 120-3 from which they were extracted and/or in association with respective start times, and the like, in the video data 105 from which the words 701-1, 701-2 were extracted (e.g. the time data 122-2, 122-3).

Figure 8:
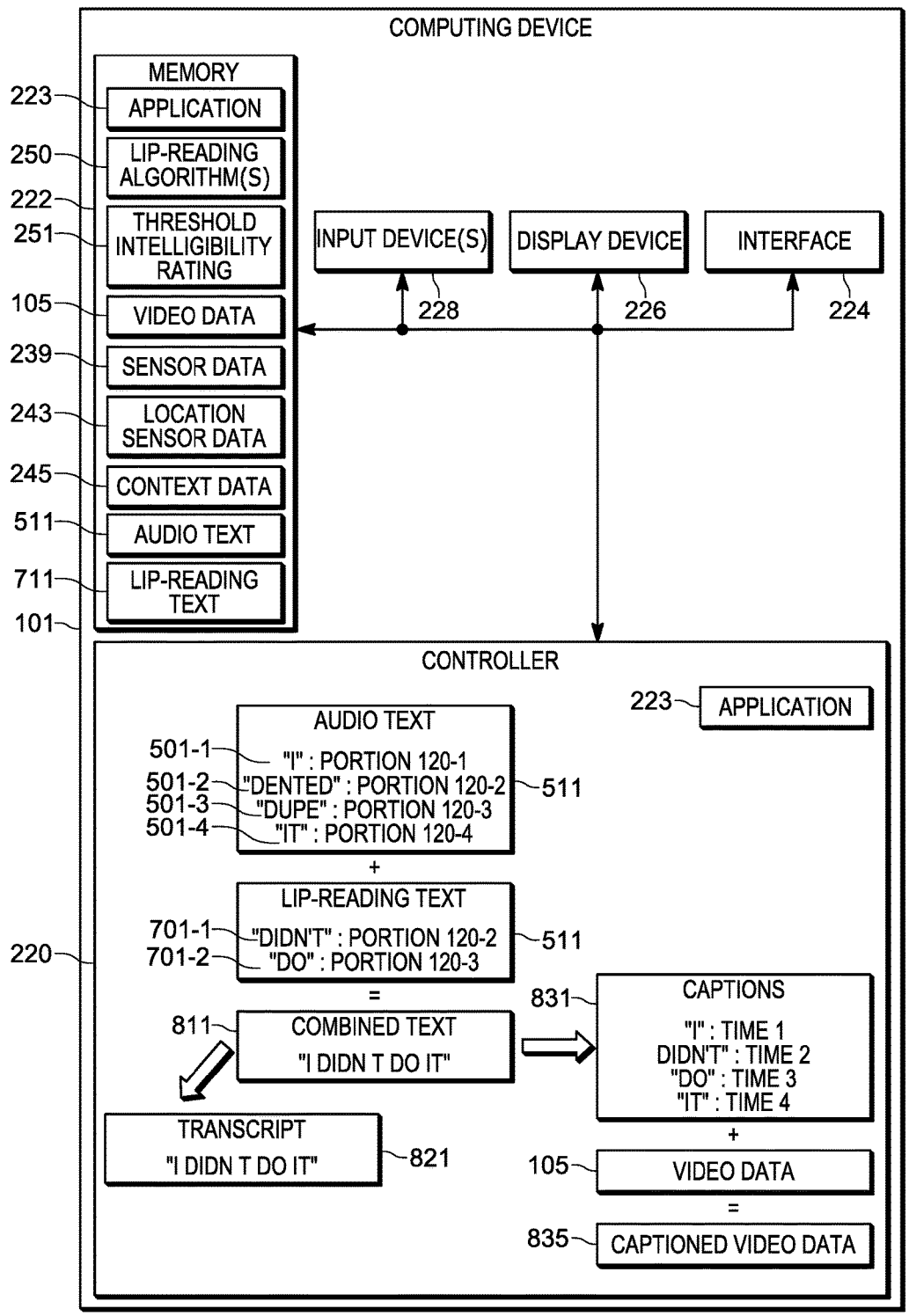
FIG. 8 depicts the computing device combing text extracted from the audio of the video data and text from the lip-reading algorithm in accordance with some embodiments.

Attention is next directed to FIG. 8 which depicts a non-limiting embodiment of the blocks 314, 316 of the method 300.

In particular, the controller 220 is combining the text 711 representative of the detected lip movement with the respective text 511 converted from the audio 121. For example, the controller 220 generates combined text 811 in which the words 501-2, 501-3 generated from the audio 121-2, 121-3 of the portions 120-2, 120-3 are replaced with corresponding words 701-1, 701-2 generated from the lip-reading algorithm 250 of the portions 120-2, 120-3. In this manner, the audio text 511 of "I Dented Do It" is clarified to "I Didn't Do It" in the combined text 811. Hence, unintelligible words 501 are replaced with corresponding words 701 determined using the lip-reading algorithm 250

However, when one of the words 501 in the text 511 is represented by a null set, and the like, such combining may further include inserting a corresponding one of the words 701 between two of the words 501 separated by the null set, and the like.

The combined text 811 may be stored at the memory 222 and/or may be used to generate a transcript 821 (e.g. at the block 316 of the method 300) in a given format, for example a format compatible with one or more of: electronic document management systems, electronic discovery systems, digital evidence management systems, court proceedings and the like. In particular, the transcript 821 may be printable.

Figure 9:
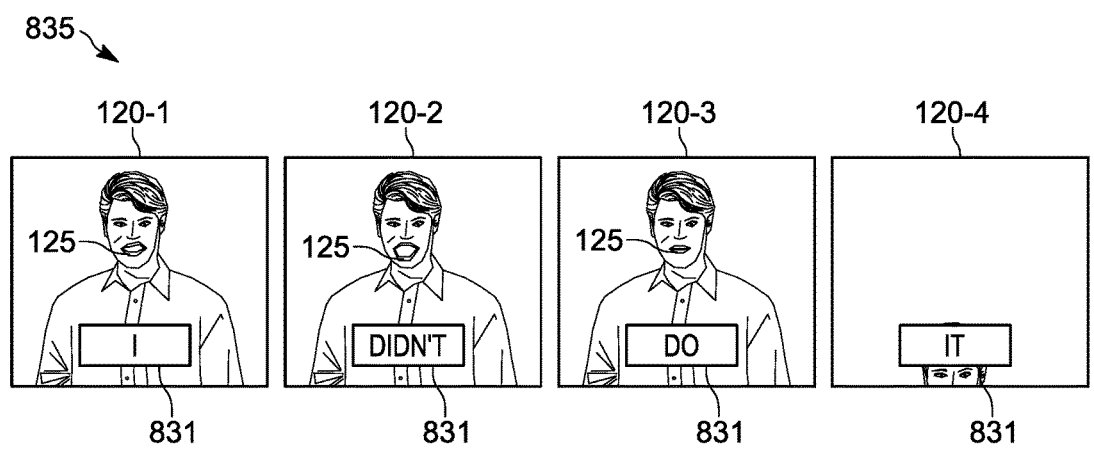
FIG. 9 depicts captioned video data in accordance with some embodiments.

Alternatively, (e.g. also at the block 316), the combined text 811 may be used to generate captions 831, for example in a format compatible with video captions, including, but not limited to, SubRip Subtitle (.SRT) files, SubViewer Subtitle (.SUB) files, YouTube™ caption (.SBV) files, and the like. For example, as depicted, each word in the combined text 811 is associated with a respective time of the video data 105 (e.g. "Time 1", etc. corresponding to the time data 122). As depicted, the captions 831 may be combined with the video data 105 to generate captioned video data 835. An example of the captioned video data 835 is depicted in FIG. 9; the captioned video data 835 is similar to the video data 105, and includes the portions 120; however, which each respective portion 120 includes a respective word from the captions 831, as determined from the times in the captions 831. The captioned video data 835 may be stored at the memory 222 and/or another memory 222. In other words, in some embodiments, the controller 220 is configured to store the text representative of the detected lip movement by: storing the text representative of the detected lip movement as text captions in video data.

Present embodiments have been described with respect to applying the lip-reading algorithm 250 to the portions 120 of the video data 105 based on the one or more portions 120 of the video data include both: audio 121 with an intelligibility rating 502 below the threshold intelligibility rating 251; and the lips 125 of a human face. However, referring again to FIG. 3 and FIG. 4, once the block 302 has been used to select the portions 120 of the video data 105 using the context data 245, etc., and the input data 401, the blocks 310, 312, 314, 316 may be executed without determining an intelligibility rating, for portions 120 of the video data 105 that include the lips 125. In other words, the method 300 may exclude determining of the intelligibility rating, and the context data 245, etc., may be used to select the portions 120.

In this manner, text representative of lip movement is generated and used to augment text from the audio in video data. Furthermore, by restricting such conversion of lip movement in video data to portions of the video data that meet certain criteria, such as an intelligibility rating being below a threshold intelligibility rating, the amount of video data in which a lip-reading algorithm may be applied is reduced. However, other criteria may be used to restrict the amount of video data in which a lip-reading algorithm may be applied. For example, context data, sensor data, and the like associated with the video data may be used to reduce the amount of video data in which a lip-reading algorithm, by applying the lip-reading algorithm only to those portions of the video data that meet criteria that match the context data, the sensor data, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
a controller and a memory, the controller configured to:
determine one or more portions of video data that include: audio with an intelligibility rating below a threshold intelligibility rating; and lips of a human face;
apply a lip-reading algorithm to the one or more portions of the video data to determine text representative of detected lip movement in the one or more portions of the video data;
convert the audio of the one or more portions of the video data to respective text;
combine the text representative of the detected lip movement with the respective text converted from the audio to generate combined text by: replacing words in the respective text converted from the audio that have respective intelligibility ratings below the threshold intelligibility rating with corresponding words from the text representative of the detected lip movement; and
store, in the memory, the combined text.

2. The device of claim 1, wherein the controller is further configured to:
generate a transcript of the combined text.

3. The device of claim 1, wherein the controller is further configured to:
select the lip-reading algorithm based on sensor data indicative of one or more of: a level of excitement of a person with whom the lips are associated; and a heart rate of the person.

4. The device of claim 1, wherein the controller is further configured to:
select the one or more portions of the video data based on one or more of video metadata and context data indicating one or more of a time and a location of an incident that corresponds to the one or more portions of the video data.

5. The device of claim 1, wherein the controller is further configured to:
select the one or more portions of the video data by performing video analytics on the video data.

6. The device of claim 1, wherein the controller is further configured to:
select the one or more portions of the video data based on sensor data indicative of an incident that corresponds to the one or more portions of the video data.

7. The device of claim 1, wherein the controller is further configured to:
select the one or more portions of the video data based on context data indicating one or more of: a severity of an incident that corresponds to the one or more portions of the video data; and a role of a person that captured the video data.

8. The device of claim 1, wherein the controller is further configured to:
generate text captions for the video data from the combined text.

9. A method comprising:
determining, at a computing device, one or more portions of video data that include: audio with an intelligibility rating below a threshold intelligibility rating; and lips of a human face;
applying, at the computing device, a lip-reading algorithm to the one or more portions of the video data to determine text representative of detected lip movement in the one or more portions of the video data;
converting the audio of the one or more portions of the video data to respective text;
combining the text representative of the detected lip movement with the respective text converted from the audio to generate combined text by: replacing words in the respective text converted from the audio that have respective intelligibility ratings below the threshold intelligibility rating with corresponding words from the text representative of the detected lip movement; and
storing, in a memory, the combined text.

10. The method of claim 9, further comprising:
generating a transcript of the combined text.

11. The method of claim 9, further comprising:
selecting the lip-reading algorithm based on sensor data indicative of one or more of: a level of excitement of a person with whom the lips are associated; and a heart rate of the person.

12. The method of claim 9, further comprising:
selecting the one or more portions of the video data based on one or more of video metadata and context data indicating one or more of a time and a location of an incident that corresponds to the one or more portions of the video data.

13. The method of claim 9, further comprising:
selecting the one or more portions of the video data by performing video analytics on the video data.

14. The method of claim 9, further comprising:
selecting the one or more portions of the video data based on sensor data indicative of an incident that corresponds to the one or more portions of the video data.

15. The method of claim 9, further comprising:
selecting the one or more portions of the video data based on context data indicating one or more of: a severity of an incident that corresponds to the one or more portions of the video data; and a role of a person that captured the video data.

16. The method of claim 9, further comprising:
generating text captions for the video data from the combined text.

* * * * *